United States Patent
Wu et al.

(10) Patent No.: US 9,367,096 B2
(45) Date of Patent: Jun. 14, 2016

(54) SLIDE SWITCH AND ELECTRONIC DEVICE THEREOF

(71) Applicant: Wistron Corporation, New Taipei (TW)

(72) Inventors: Jing-Tang Wu, New Taipei (TW); Tsung-Ying Tsai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 155 days.

(21) Appl. No.: 13/778,149

(22) Filed: Feb. 27, 2013

(65) Prior Publication Data

US 2013/0313090 A1    Nov. 28, 2013

(30) Foreign Application Priority Data

May 22, 2012    (TW) .............................. 101118147 A

(51) Int. Cl.
*G06F 1/16* (2006.01)
*E05C 1/10* (2006.01)

(52) U.S. Cl.
CPC ............ *G06F 1/1679* (2013.01); *G06F 1/1616* (2013.01); *G06F 1/1635* (2013.01); *G06F 1/1656* (2013.01); *G06F 1/1658* (2013.01)

(58) Field of Classification Search
CPC ... G06F 1/1679; G06F 1/1616; G06F 1/1658; G06F 1/1656; G06F 1/1635; G06F 1/1632; H01M 2220/30; H01M 2/1066; H01H 15/10
USPC .............. 292/300, 302, 8, 24, 31, 32, 42, 95, 292/101–103, 106, 128, 137, 121, 163, 175, 292/145, 146, 147, 150, DIG. 11; 361/679.58, 807, 754, 679.55; 429/100, 96, 97

See application file for complete search history.

(56) References Cited

U.S. PATENT DOCUMENTS 8,546,008 B2 * 10/2013 Lai .................................. 429/96
8,553,412 B2 * 10/2013 Lai ........................... 361/679.58

(Continued)

FOREIGN PATENT DOCUMENTS

CN    201867701         6/2011
TW    201112920 A1    4/2011

OTHER PUBLICATIONS

Office action mailed on Apr. 2, 2014 for the Taiwan application No. 101118147, filing date: May 22, 2012, p. 2 and p. 3 line 1-18.
Office action mailed on Aug. 5, 2015 for the China application No. 201210183193.X, p. 3 line 4-35, p. 4-5 and p. 6 line 1-10.

*Primary Examiner* — Alyson M Merlino
(74) *Attorney, Agent, or Firm* — Winston Hsu; Scott Margo

(57) ABSTRACT

A slide switch for constraining a movement of a unit relative to a casing is disclosed in the present invention. The slide switch includes a buckling component, a constraining component and a latch. The buckling component includes a connection portion and an inclined structure. The constraining component includes a block portion and a guide portion. The latch includes a body, a hook portion disposed on the body, a first guide structure disposed on a top of the hook portion, and a contact portion disposed on the body. The hook portion is engaged with the connection portion to constrain the movement of a first unit. The first guide structure pushes the inclined structure to separate the first unit from the casing. The contact portion contacts the block portion to constrain the movement of a second unit, and slides relative to the guide portion to separate the second unit from the casing.

20 Claims, 10 Drawing Sheets

(56) References Cited

U.S. PATENT DOCUMENTS

| | | | |
|---|---|---|---|
| 8,693,190 B2* | 4/2014 | Chang | 361/679.58 |
| 8,808,891 B2* | 8/2014 | Chiang et al. | 429/96 |
| 2006/0226174 A1* | 10/2006 | Lin | 222/321.1 |
| 2011/0072725 A1* | 3/2011 | Cheng et al. | 49/279 |
| 2013/0154282 A1* | 6/2013 | Liang | G06F 1/1658 292/175 |
| 2013/0163208 A1* | 6/2013 | Zhang | G06F 1/1658 361/724 |
| 2014/0211381 A1* | 7/2014 | Yuan | G06F 1/1656 361/679.01 |

\* cited by examiner

SLIDE SWITCH AND ELECTRONIC DEVICE THEREOF

BACKGROUND OF THE INVENTION

1. Field of the Invention

The present invention relates to a slide switch, and more particularly, to a slide switch with a multi-step lock/unlock function and an electronic device thereof.

2. Description of the Prior Art

A bottom of the conventional notebook computer includes two movable units, such as a battery and a protection cover. The battery is fixed by a plurality of slide switches, and the protection cover is locked by screws. For design of the screw fastener, a plurality of holes is formed on a surface of the protection cover, and each screw can insert into the corresponding hole for the fastener. An artistic appearance of the notebook computer is decreased due to the hole on the protection cover, and a tool, such as a screwdriver, is necessary to assemble and to disassemble the protection cover. In addition, the popular notebook computer trends to slime and slight features. The conventional mechanical design that disposes the plurality of slide switches and the plurality of screws on the bottom wastes structural disposition of the notebook computer. The mechanical design of the conventional notebook computer has drawbacks of expensive manufacturing cost and large-scaled volume. Therefore, design of a multi-segment switch capable of easily locking and unlocking the plurality of units is an important issue in the mechanical industry.

SUMMARY OF THE INVENTION

The present invention provides a slide switch with a multi-step lock/unlock function and an electronic device thereof for solving above drawbacks.

According to the claimed invention, a slide switch disposed on a casing of an electronic device for constraining movements of a first unit and a second unit relative to the casing is disclosed. The slide switch includes a buckling component, a constraining component and a latch. The buckling component is disposed on the first unit, and the buckling component includes a connection portion and an inclined structure. The constraining component is disposed on the second unit, and the constraining component includes a block portion and a guide portion. The latch is for latching the buckling component and the constraining component. The latch includes a body, a hook portion, a first guide structure and a contact portion. The body is slidably disposed on the casing. The hook portion is disposed on the body. The hook portion is engaged with the connection portion to constrain the movement of the first unit relative to the casing when the body moves at a first position relative to the casing. The first guide structure is disposed on a top of the hook portion. The first guide structure presses the inclined structure to separate the first unit from the casing when the body moves at a second position relative to the casing. The contact portion is disposed on the body. The contact portion contacts against the block portion to constrain the movement of the second unit relative to the casing when the hook portion is engaged with the connection portion, and the contact portion further slides relative to the guide portion to separate the second unit from the casing when the body moves at a third position relative to the casing.

According to the claimed invention, the latch further includes a second guide structure disposed on the top of the hook portion. The first guide structure and the second guide structure are respectively disposed on two sides of the top. A bottom of the connection portion slides relative to the second guide structure so as to slide the body relative to the casing.

According to the claimed invention, the constraining component further includes an inclined portion connected to a side of the block portion adjacent to an inner of the casing. The constraining component slides the body relative to the casing via a contact between the inclined portion and the contact portion.

According to the claimed invention, the hook portion is disposed on a first side of the body, and the contact portion is disposed on a second side of the body opposite to the first side.

According to the claimed invention, the latch further comprises a plurality of hook portions, the buckling component further comprises a plurality of connection portions and a plurality of inclined structures, each hook portion is matched with the corresponding connection portion and the corresponding inclined structure.

According to the claimed invention, the latch further includes a plurality of contact portions, and the constraining component further includes a plurality of block portions and a plurality of guide portions. Each contact portion is matched with the corresponding block portion and the corresponding guide portion.

According to the claimed invention, the buckling component further includes a wall structure connected to the inclined structure. The hook portion contacts against the wall structure, so as to constrain a movement of the body from the second position to the third position when the first unit is not separated from the casing.

According to the claimed invention, the slide switch further includes a resilient component. Two ends of the resilient component are respectively connected to the body and the casing. The resilient component moves the body from the third position to the first position and from the second position to the first position.

According to the claimed invention, the second position is located between the first position and the third position. The body moves relative to the casing through the first position, the second position and the third position in sequence.

According to the claimed invention, the first unit is a battery unit, and the second unit is a protection cover.

According to the claimed invention, an electronic device includes a casing, a first unit, a second unit and a slide switch. The first unit is detachably disposed on the casing. The second unit is detachably disposed on the casing and located at a position different from the first unit. The slide switch is for constraining movements of the first unit and the second unit relative to the casing. The slide switch includes a buckling component, a constraining component and a latch. The buckling component is disposed on the first unit, and the buckling component includes a connection portion and an inclined structure. The constraining component is disposed on the second unit, and the constraining component includes a block portion and a guide portion. The latch is for latching the buckling component and the constraining component. The latch includes a body, a hook portion, a first guide structure and a contact portion. The body is slidably disposed on the casing. The hook portion is disposed on the body. The hook portion is engaged with the connection portion to constrain the movement of the first unit relative to the casing when the body moves at a first position relative to the casing. The first guide structure is disposed on a top of the hook portion. The first guide structure presses the inclined structure to separate the first unit from the casing when the body moves at a second position relative to the casing. The contact portion is disposed on the body. The contact portion contacts against the block portion to constrain the movement of the second unit relative to the casing when the hook portion is engaged with the connection portion, and the contact portion further slides relative to the guide portion to separate the second unit from the casing when the body moves at a third position relative to the casing.

The slide switch of the present invention can dispose the plurality of hook portions and contact portions on two sides of the latch, and further include the corresponding buckling components and the constraining components. By adjusting space relation between the connection portion and the inclined structure of the buckling component, and space relation between the block portion and the guide portion of the constraining component, the latch can utilize the hook portions and the contact portions to actuate the corresponding buckling components and the constraining components in sequence and in turn according to the movement of the body, so as to obtain the multiple lock/unlock function. In addition, the slide switch of the present invention has advantages of simple structure, easy operation, low design cost and low manufacturing cost. The present invention can economize structural space, increase artistic appearance, and is extensively applied to the related electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
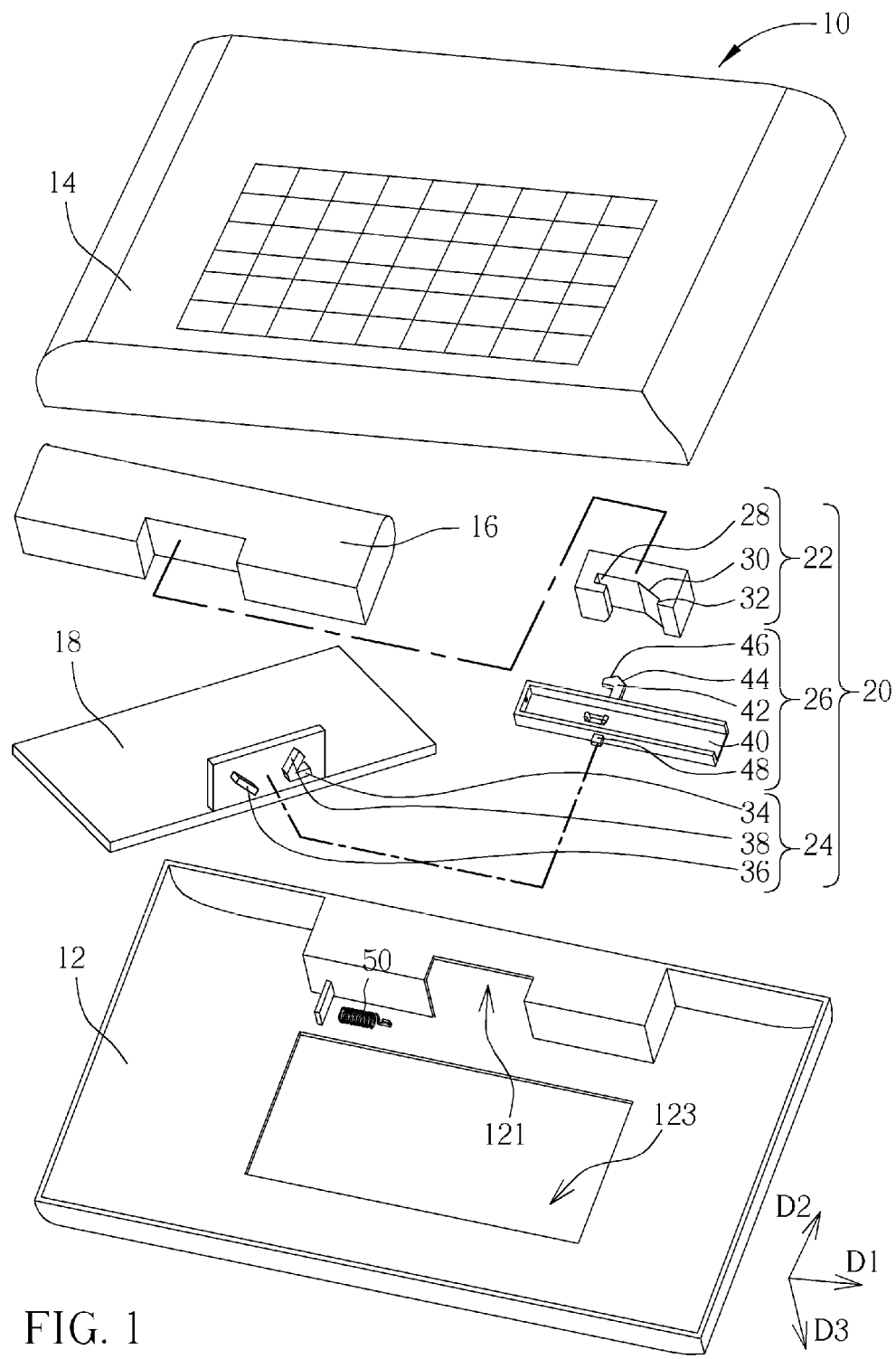
FIG. 1 is an exploded diagram of an electronic device according to an embodiment of the present invention.
Figure 2:
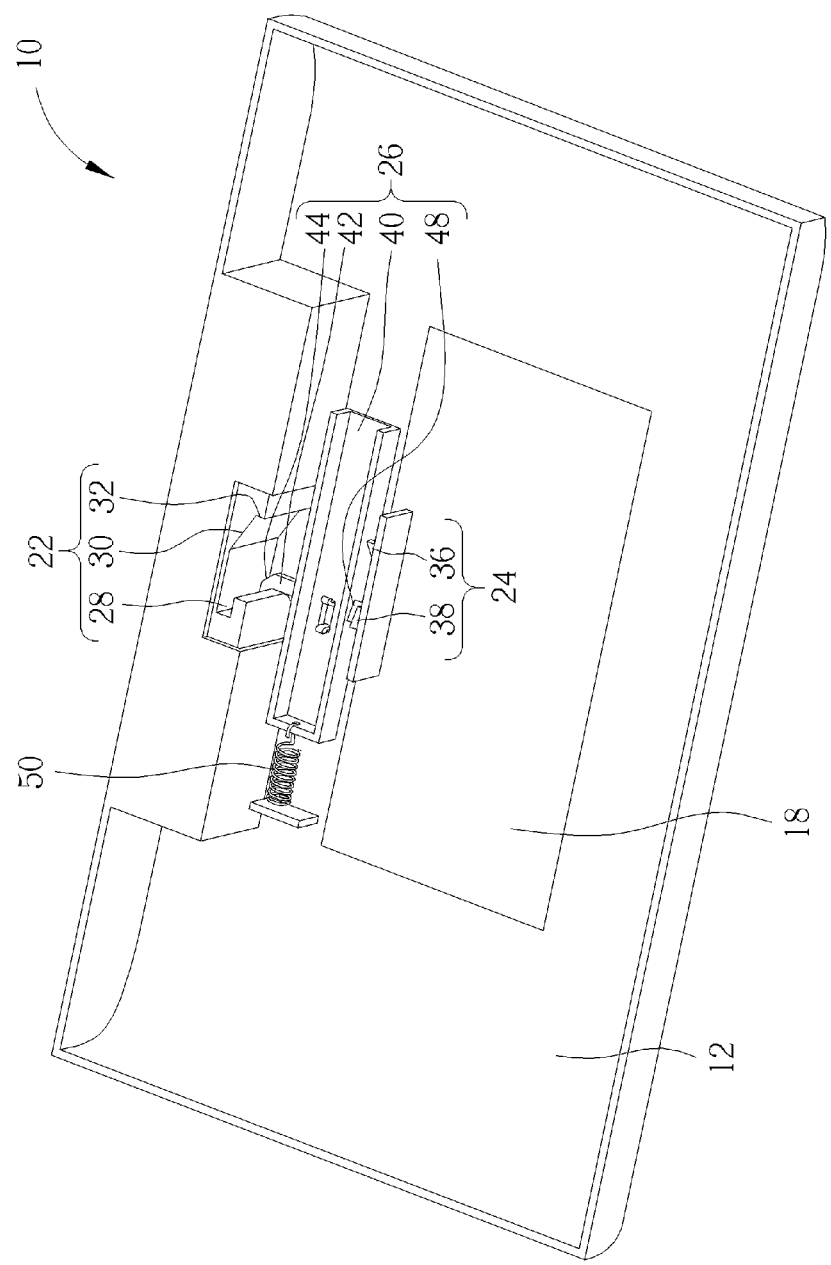
FIG. 2 is an assembly diagram of a part of the electronic device according to the embodiment of the present invention.

Please refer to FIG. 1 and FIG. 2. FIG. 1 is an exploded diagram of an electronic device 10 according to an embodiment of the present invention. FIG. 2 is an assembly diagram of a part of the electronic device 10 according to the embodiment of the present invention. The electronic device 10 can be a tablet computer or a host of a notebook computer, which depends on design demand. The electronic device 10 includes a casing 12, a cover 14, a first unit 16, a second unit 18 and a slide switch 20. The casing 12 can be a bottom of the electronic device 10 for supporting a plurality of electronic components, such as a processor, a memory module, a storage module, and so on. The cover 14 can cover the casing 12 for dust protection. A keyboard or a touch panel can be disposed on the cover 14. User interface's selection of the electronic device 10 corresponds to the design demand, and a detailed description is omitted herein for simplicity.

The first unit 16 and the second unit 18 can be detachably disposed on different positions of the casing 12. For example, the first unit 16 can be a battery unit installed on an accommodating structure 121 of the casing 12. The second unit 18 can be a protection cover for capping a hole 123 on the casing 12, so as to seal the casing 12 for the dust protection. Because the first unit 16 and the second unit 18 are movable units, the slide switch 20 has functions for simultaneously constraining movements of the first unit 16 and the second unit 18 relative to the casing 12, and further for releasing the constraint of the first unit 16 and the second unit 18 in sequence. Thus, the first unit 16 and the second unit 18 can be separated from the casing 12 respectively.

As shown in FIG. 1 and FIG. 2, the slide switch 20 includes a buckling component 22, a constraining component 24 and a latch 26. The buckling component 22 is disposed on the first unit 16. The buckling component 22 includes an engaging structure 28, an inclined structure 30 and a wall structure 32. The engaging structure 28 and the inclined structure 30 are respectively disposed on two edges on an inner of the buckling component 22, and the wall structure 32 can be connected to the inclined structure 30, so that a sunken space can be formed on the inner of the buckling component 22. The constraining component 24 is disposed on the second unit 18. The constraining component 24 includes a block portion 34, a guide portion 36 and an inclined portion 38. The block portion 34 and the guide portion 36 respectively are independent portions, and the inclined portion 38 can be connected to a side of the block portion 34 adjacent to an inner of the casing 12. The latch 26 can lock the buckling component 22 and the constraining component 24, so as to constrain movements of the buckling component 22 and the constraining component 24 relative to the casing 12.

In addition, the latch 26 includes a body 40, a hook portion 42, a first guide structure 44, a second guide structure 46 and a contact portion 48. The body 40 is slidably disposed inside the casing 12. Two ends of a resilient component 50 disposed on the slide switch 20 are respectively connected to the body 40 and the casing 12. The hook portion 42 and the contact portion 48 can be disposed on the same side or the different sides of the body 40, alternatively. For example, the hook portion 42 can be disposed on a first side 401 of the body 40, and the contact portion 48 can be disposed on a second side 403 of the body 40 opposite to the first side 401. Positions of the hook portion 42 and the contact portion 48 on the body 40 are not limited to the above-mentioned embodiment, and depend on structural design demand. Further, the first guide structure 44 and the second guide structure 46 can be respectively disposed on two edges of a top of the hook portion 42.

Figure 3:
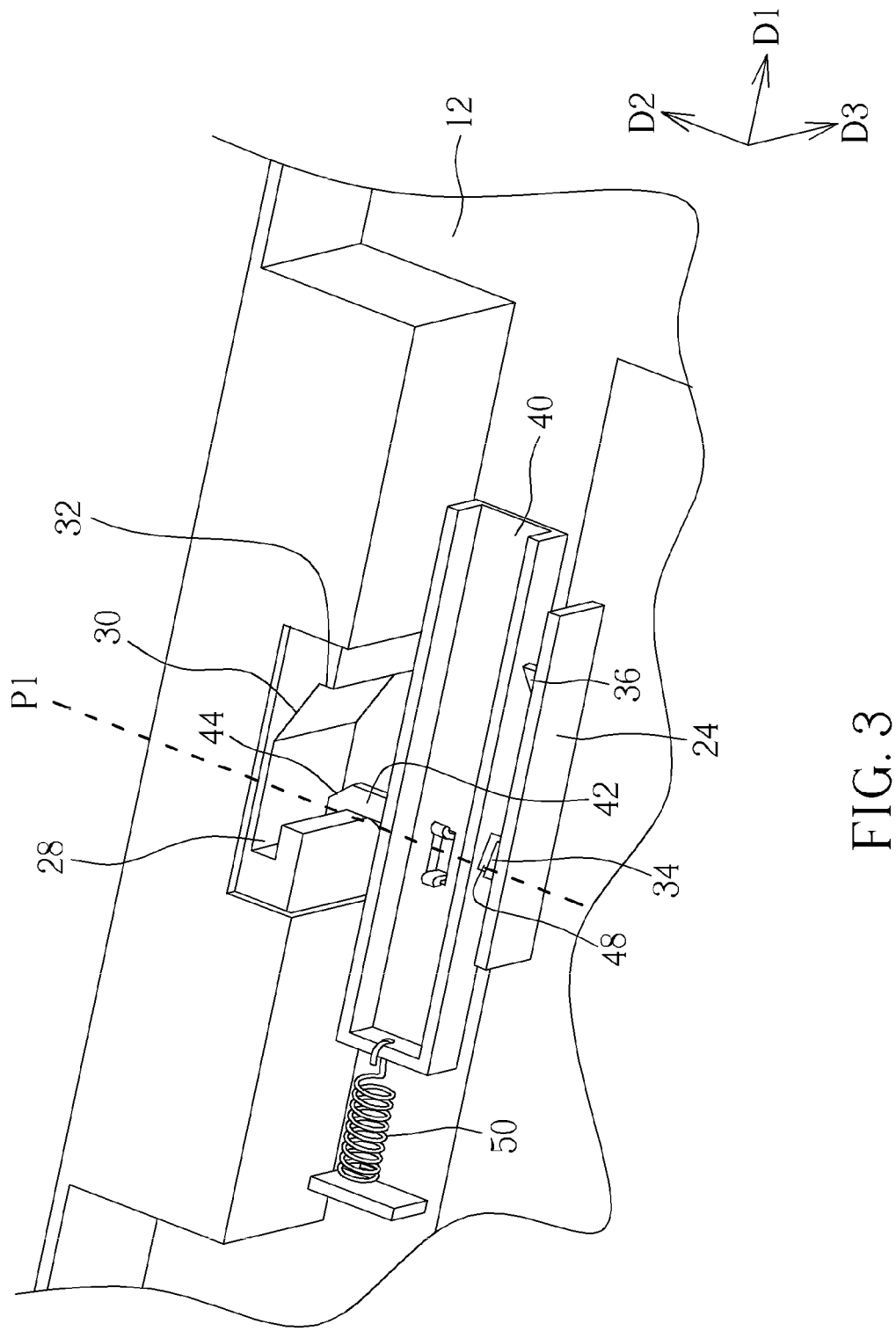
FIG. 3 to FIG. 6 respectively are diagrams of the electronic device in different operating modes according to the embodiment of the present invention.
Figure 4:
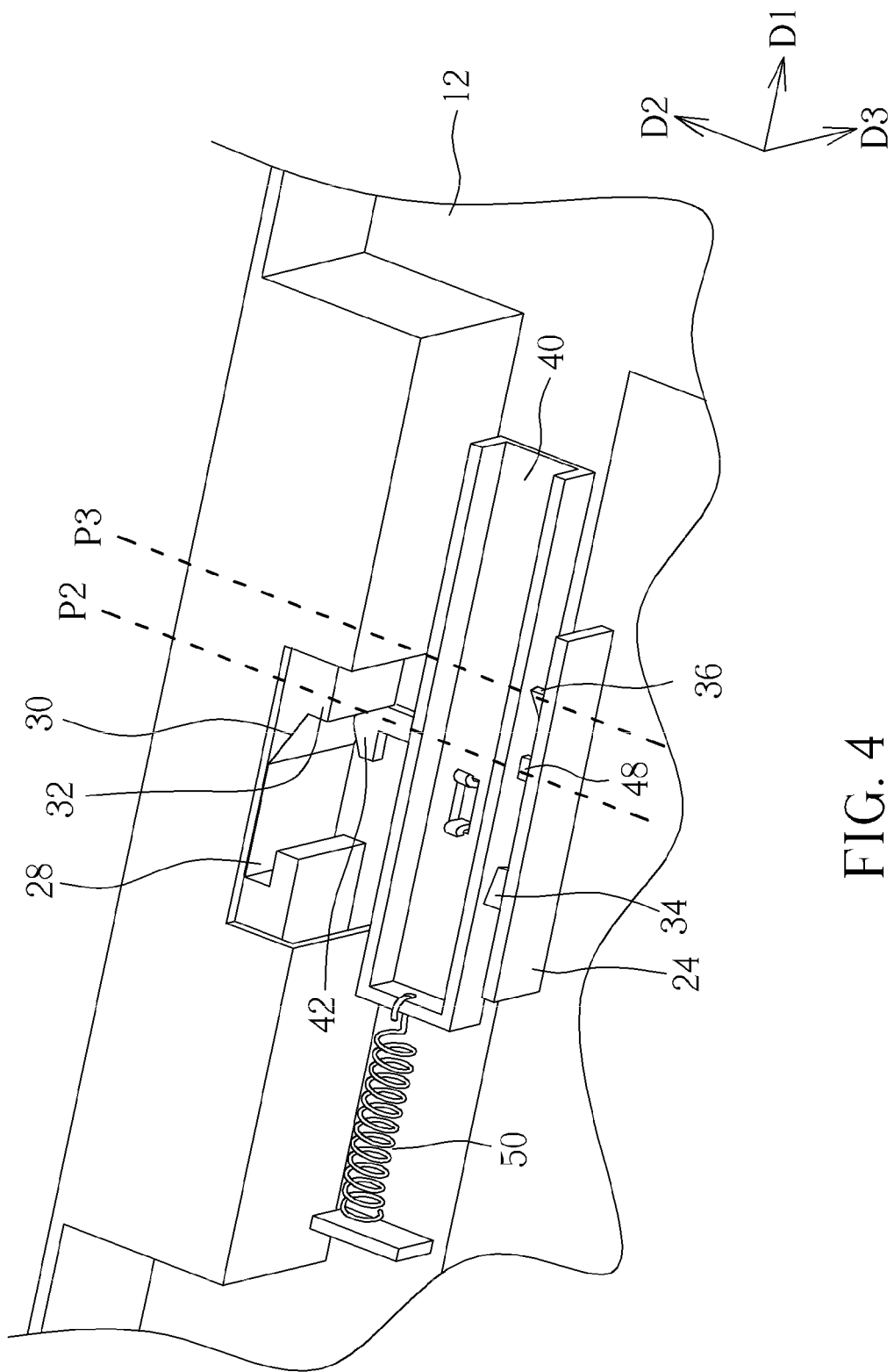
Figure 5:
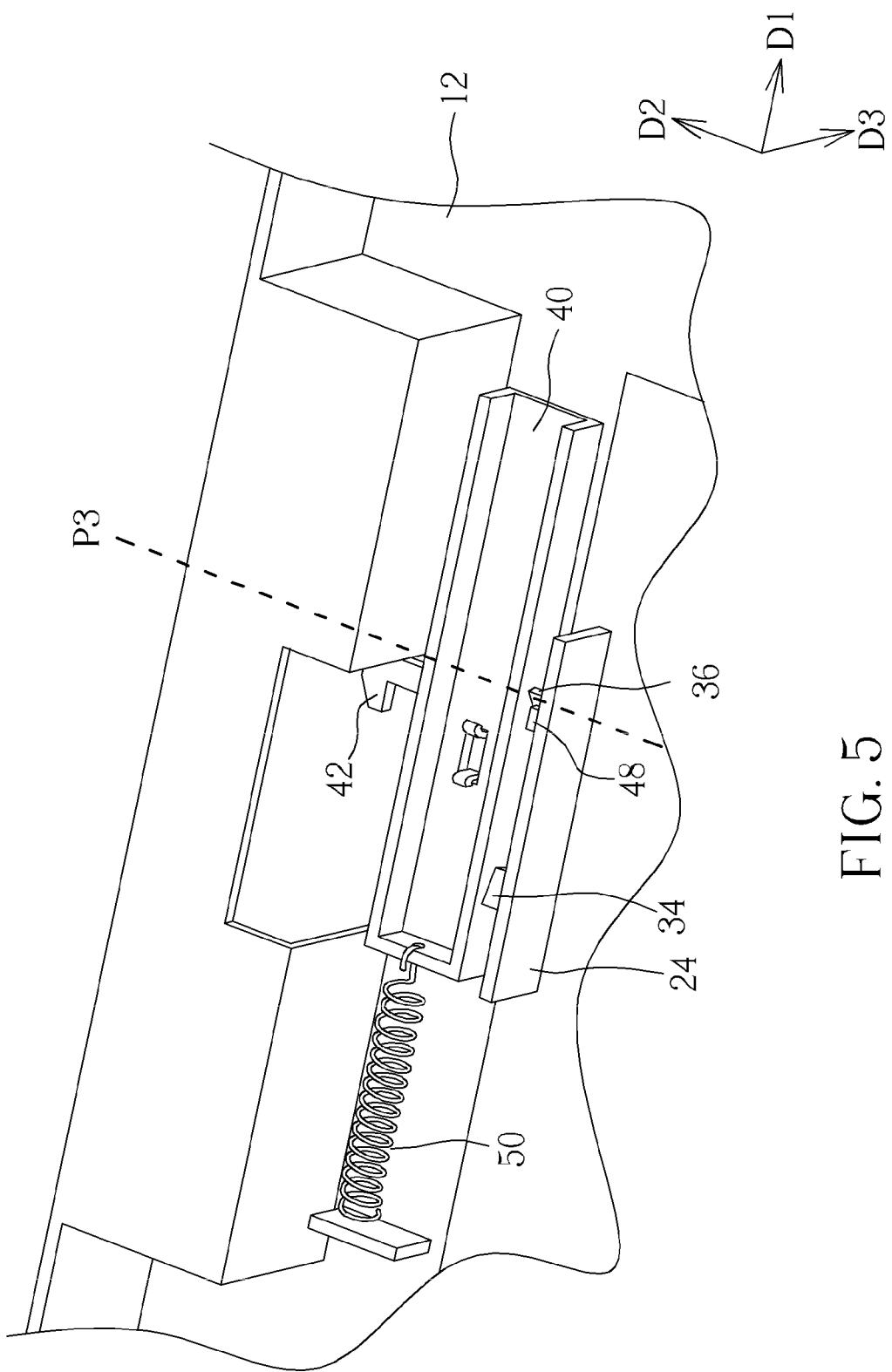
Figure 6:
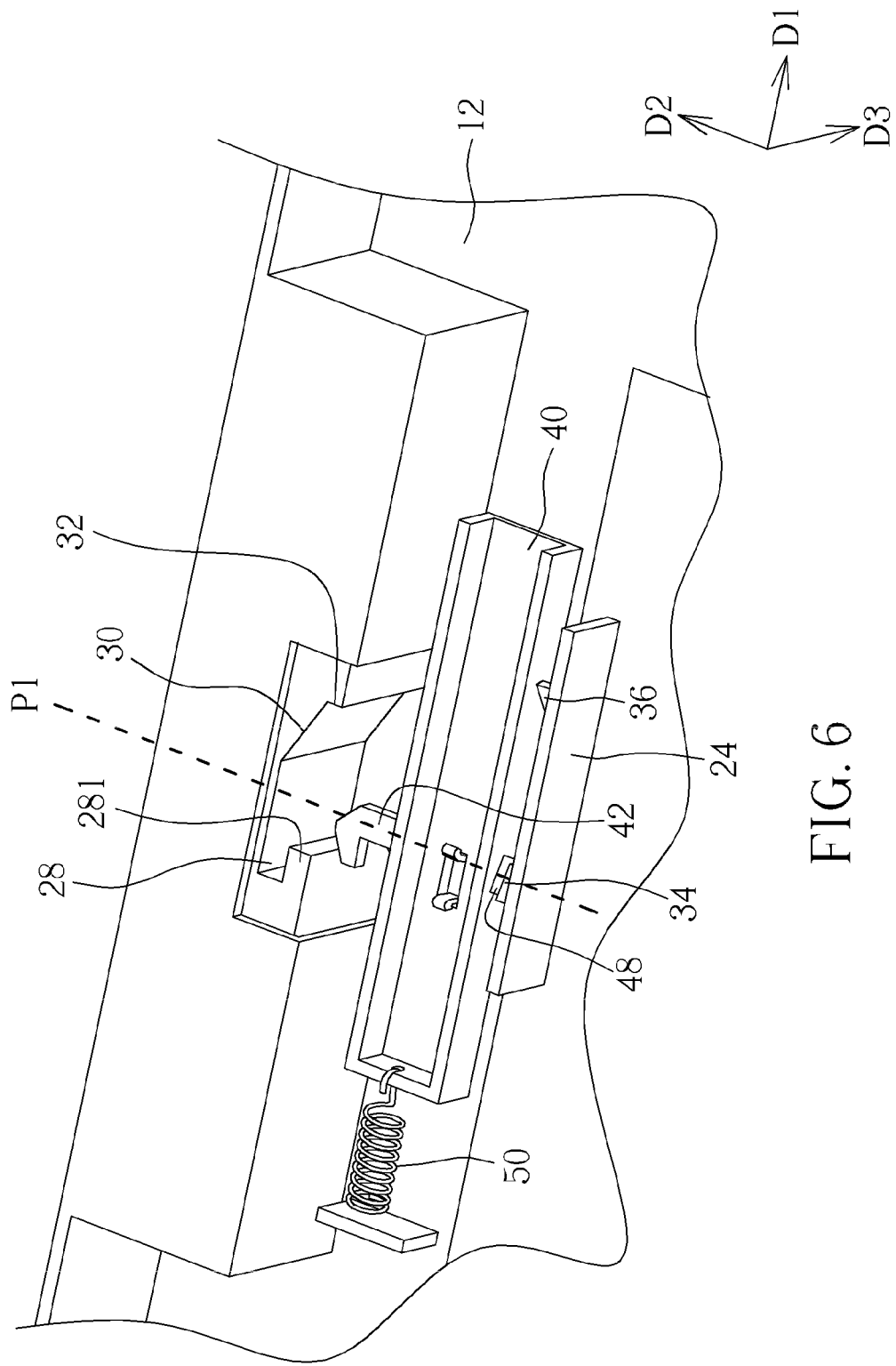

Please refer to FIG. 1 to FIG. 6. FIG. 3 to FIG. 6 respectively are diagrams of the electronic device 10 in different operating modes according to the embodiment of the present invention. FIG. 3 illustrates a diagram that the electronic device 10 utilizes the slide switch 30 to constrain the movements of the first unit 16 and the second unit 18. FIG. 4 illustrates a diagram that the electronic device 10 utilizes the slide switch 20 to remove the first unit 16 and to keep the second unit 18 in stability. FIG. 5 illustrates a diagram that the electronic device 10 utilizes the slide switch 20 to remove the second unit 18 after the first unit 16 is removed. FIG. 6 illustrates a diagram that the electronic device 10 utilizes the slide switch 20 to install the first unit 16 and the second unit 18.

As shown in FIG. 3, the body 40 is at a first position P1 relative to the casing 12. The hook portion 42 inserts into the sunken space on the buckling component 22 and is engaged with the connection portion 28, so as to constrain the movement of the first unit 16 relative to the casing 12. It is to say, the connection portion 28 can be a crook-shaped structure or a hollow structure. Meanwhile, the contact portion 48 contacts against the block portion 34 of the constraining component 24, so as to constrain the movement of the second unit 18 relative to the casing 12. Therefore, the present invention can utilize the slide switch 20 to simultaneously lock the first unit 16 and the second unit 18 for preventing separation relative to the casing 12.

As shown in FIG. 4, the body 40 slides relative to the casing 12 along a first direction D1 to be located at a second position P2. The first guide structure 44 of the hook portion 42 can contact against the inclined structure 30 of the buckling component 22. The first guide structure 44 and the inclined structure 30 can be designed as shapes capable of matching with each other. For example, the first guide structure 44 and the inclined structure 30 can respectively be plane structures with matched inclined angle. Due to slide between the first guide structure 44 and the inclined structure 30, the latch 26 can separate the first unit 16 from the casing 12 along a second direction D2 different from the first direction D1, so as to remove the first unit 16 conveniently. At this time, the contact portion 48 does not contact any element when the contact portion 48 is located between the block portion 34 and the guide portion 36 of the constraining component 24, which means the second unit 18 is steady without action by the slide switch 20. When the first guide structure 44 moves to an end of the inclined structure 30, the hook portion 42 can contact the wall structure 32, and a movement of the body 40 relative to the casing 12 is constrained, so that the body 40 can not move from the second position P2 to a third position P3.

For removing the first unit 16, an external force applied to the body 40 can be released after the first unit 16 is separated from the casing 12, so that the resilient component 50 can move the body 40 from the second position P2 to the first position P1. The movement of the second unit 18 is still constrained by the slide switch 20. For removing the second unit 18, as shown in FIG. 5, the body 40 can be pushed along the first direction D1, so as to move the body 40 relative to the casing 12 for locating at the third position P3. The contact portion 48 can contact and slide relative to the guide portion 36 of the constraining component 24. According to a structural direction of the guide portion 36, the latch 26 can separate the second unit 18 from the casing 12 along a third direction D3 different from the first direction D1 and the second direction D2, and then, the second unit 18 can be removed conveniently. The external force applied to the body 40 can be released after the second unit 18 is removed, and the resilient component 50 can move the body 40 from the third position P3 to the first position P1.

As shown in FIG. 6, there is no external force applied to the latch 26 to overcome a resilient recovering force of the resilient component 50, and the body 40 keeps at the first position P1. When the first unit 16 is pushed into the casing 12, a bottom 281 of the connection portion 28 can contact the hook portion 42 of the latch 26 to generate interference. For installing the first unit 16 into the casing 12 smoothly, the external force is applied to the first unit 16 along a direction opposite to the second direction D2, and the first unit 16 can move into the accommodating structure 121 of the casing 12. At this time, the bottom 281 of the connection portion 28 of the buckling component 22 can slide relative to the second guide structure 46, so as to move the body 40 relative to the casing 12 along the first direction D1. The body 40 can slightly move out of the first position P1 to be spaced from the bottom 281, so as to release the interference between the hook portion 42 and the connection portion 28. After the above-mentioned interference is released, the hook portion 42 enters the sunken space of the buckling component 22, the slide switch 20 can utilize the resilient recovering force of the resilient component 50 to push the latch 26, so as to recover the hook portion 42 to the first position P1. Thus, the hook portion 42 can be accurately engaged with the connection portion 28 of the buckling component 22, and an assembly of the first unit 16 and the casing 12 is completed.

Figure 7:
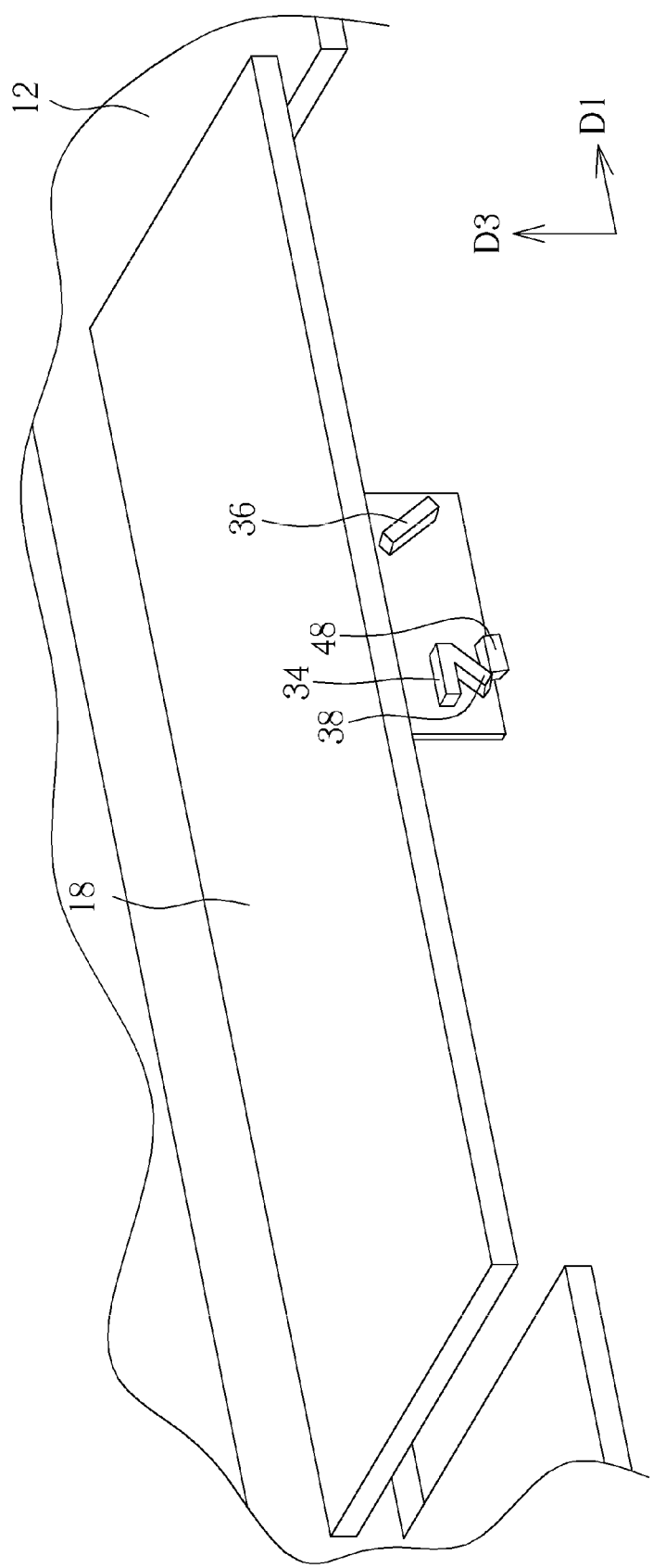
FIG. 7 to FIG. 9 respectively are diagrams of the electronic device in different operating modes and at the other view according to the embodiment of the present invention.
Figure 8:
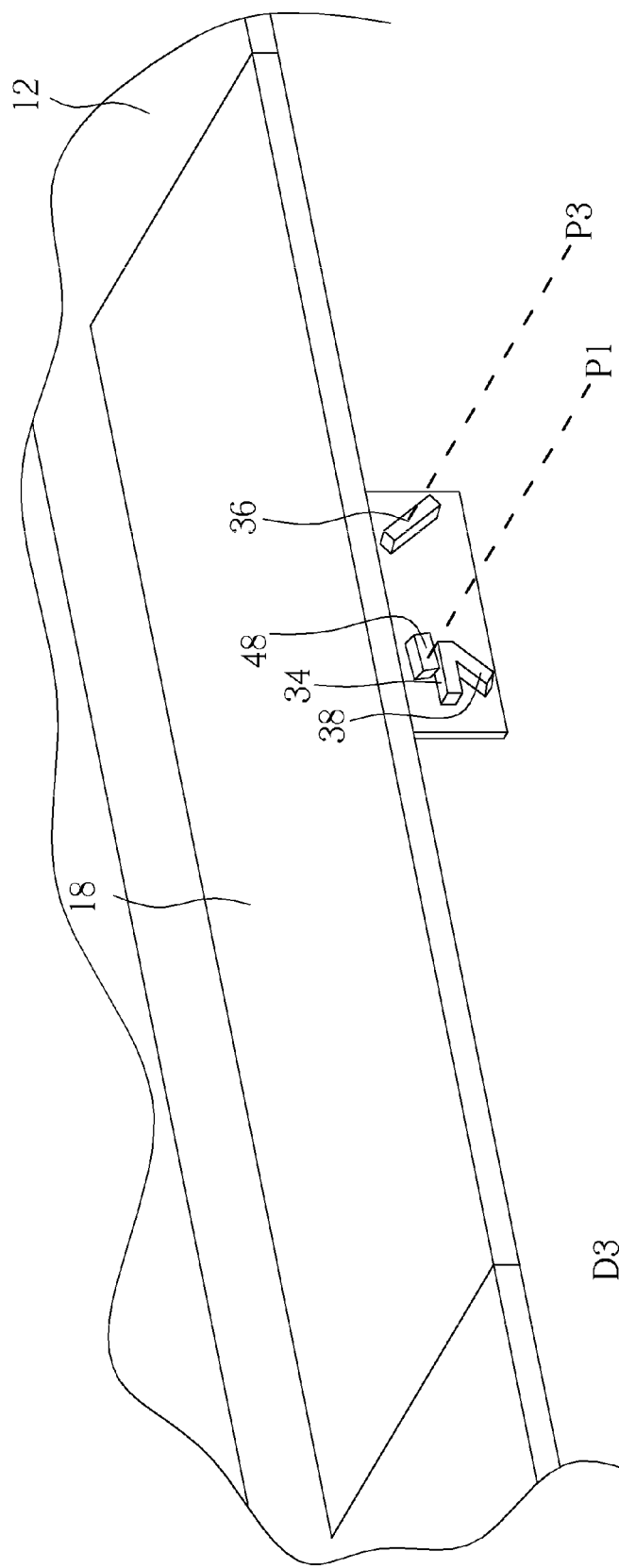
Figure 9:
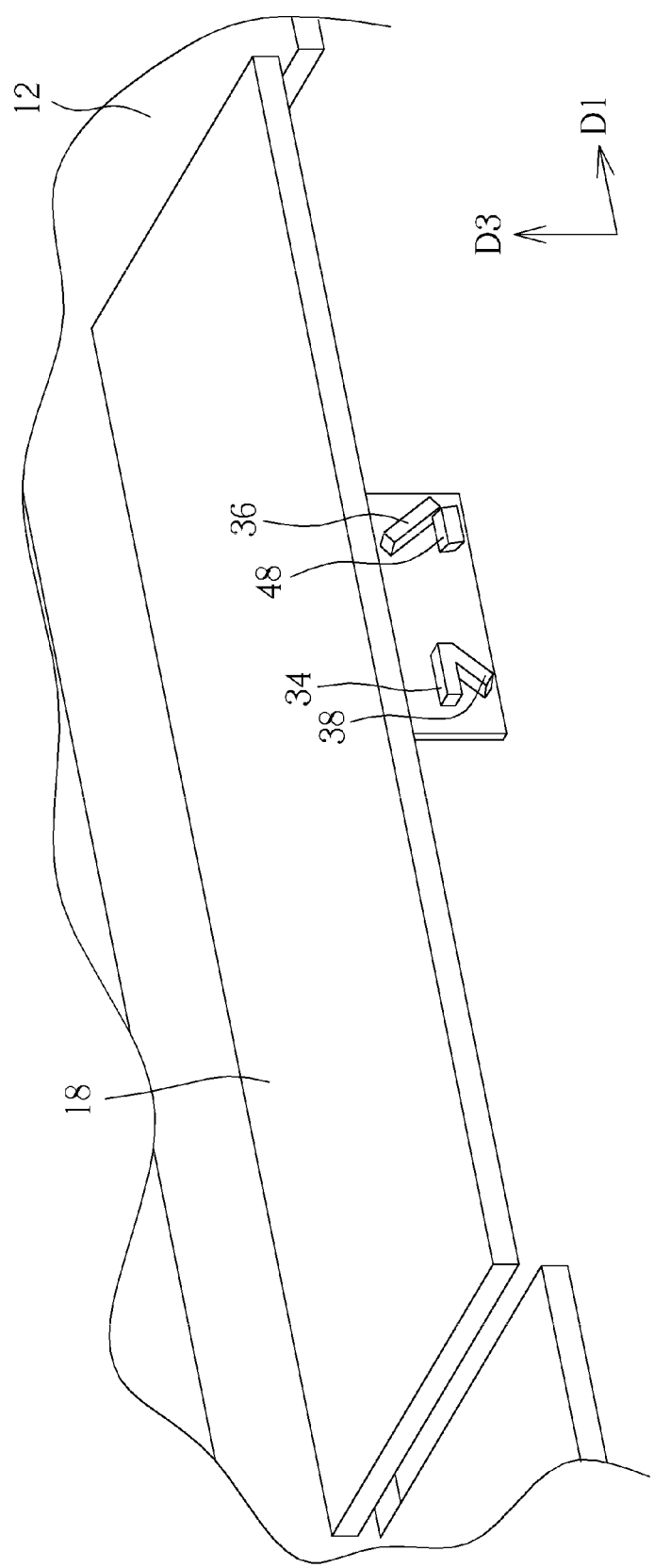

Please refer to FIG. 1, FIG. 2, and FIG. 7 to FIG. 9. FIG. 7 to FIG. 9 respectively are diagrams of the electronic device 10 in different operating modes and at the other view according to the embodiment of the present invention. FIG. 7 illustrates a diagram shown in FIG. 6 in the other view. FIG. 8 illustrates a diagram shown in FIG. 3 in the other view. FIG. 9 illustrates a diagram shown in FIG. 5 in the other view. As shown in FIG. 7, the contact portion 48 overlaps the block portion 34 to generate interference when the second unit 18 is installed into the casing 12. Due to the structural design of the present invention, the inclined portion 38 of the constraining component 24 can slide relative to the contact portion 48 when the second unit 18 moves downwardly, the body 40 moves relative to the casing 12 along the first direction D1, so that the contact portion 48 can move to a position which does not overlap the block portion 34 via a surface of the inclined portion 38, so as to release the interference between the block portion 34 and the contact portion 48. The above-mentioned position can be an edge of the block portion 34. Then, the second unit 18 is installed into the casing 12 smoothly.

As shown in FIG. 6 and FIG. 8, the external force applied to the latch 26 can be released when installing the second unit 18 into the casing 12, and the resilient component 50 can slide the body 40 of the latch 26 (relative to the casing 12) back to the first position P1 along a direction opposite to the first direction D1, so that the contact portion 48 can tightly contact against the block portion 34, and the second unit 18 is assembled with the casing 12 stably. As shown in FIG. 5 and FIG. 9, the latch 26 can be pushed along the first direction D1 when detaching the second unit 18. The body 40 can move from the first position P1 to the third position P3, the contact portion 48 of the latch 26 can slide relative to the guide portion 36 of the constraining component 24, so as to upwardly push the second unit 18 along the third direction D3, and the second unit 18 can be disassembled from the casing 12.

It is to say, the slide switch 20 of the present invention has an idle-proof function. The first unit 16 and the second unit 18 are respectively disassembled from the casing 12 in sequence by a series of predetermined steps. When the latch 26 is located at the first position P1, the hook portion 42 is engaged with the connection portion 28, the contact portion 48 contacts the block portion 34, so that the first unit 16 and the second unit 18 can be locked by the latch 26 simultaneously. When the latch 26 moves to the second position P2, the hook portion 42 moves away from the connection portion 28 without the interference, the first guide structure 44 can slide relative to the inclined structure 30, so that the hook portion 42 can separate the first unit 18 from the casing 12 along the second direction D2. Meanwhile, the contact portion 48 of the latch 26 does not contact the guide portion 36, and the constraining component 24 keeps covering the hole 123 on the casing 12.

When the body 40 is located at the second position P2, the hook portion 42 can contact against the wall structure 32 of the buckling component 22. The body 40 can not slide along the first direction D1 by the interference of the hook portion 42 and the wall structure 32. Until the buckling component 22 is separated from the accommodating structure 121 of the casing 12 with the first unit 16, the latch 26 can move toward the third position P3 by the external force. When the latch 26 moves at the third position P3, the contact portion 48 can move relative to the guide portion 36 of the constraining component 24, so as to separate the second unit 18 from the casing 12 along the third position D3. Therefore, the body 40 of the latch 26 can move relative to the casing 12 through the first position P1, the second position P2 and the third position P3 in sequence, so as o execute the separation between the first unit 16 and the second unit 18 relative to the casing 12. The first unit 16 (the battery unit) is disassembled to stop energy transmission of the electronic device 10, and then the second unit 18 (the protection cover) can be removed to repair the electronic components inside the casing 12.

In addition, the slide switch 20 of the present invention can have multiple lock/unlock functions according to actual design. For example, the hook portion 42 and the contact portion 48 of the latch 26 can be selectively disposed on the same side of the body 40, and the first unit 16 and the second unit 18 can be disposed on the same side of the latch 26 accordingly. Further, the latch 26 of the slide switch 20' of the present invention can include a plurality of hook portions 42 and a plurality of contact portions 48, the hook portions 42 and the contact portions 48 can be selectively disposed on the same side or the different sides of the body 40.

Figure 10:
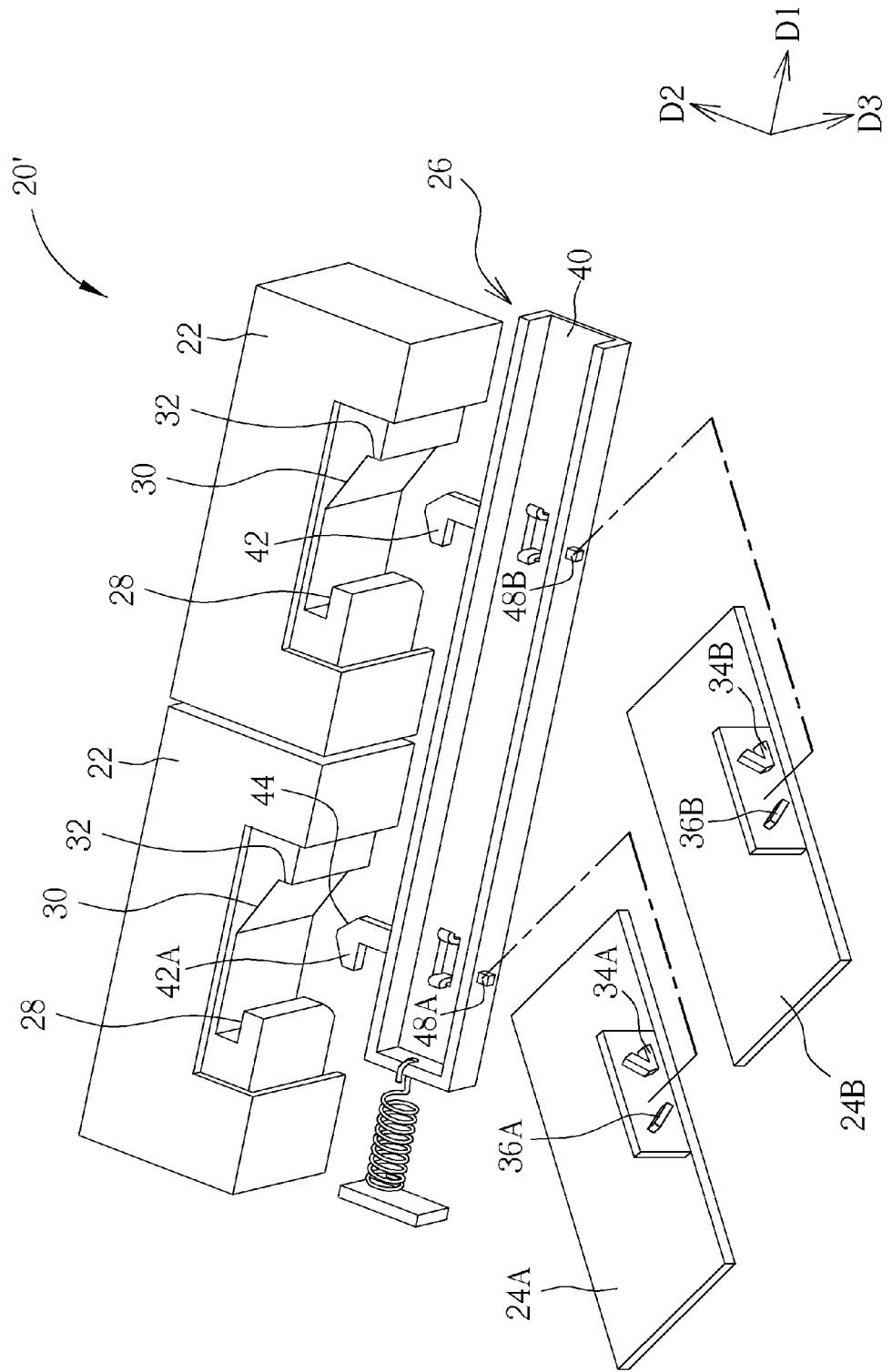
FIG. 10 is a diagram of the slide switch according to the other embodiment of the present invention.

Please refer to FIG. 10. FIG. 10 is a diagram of the slide switch 20' according to the other embodiment of the present invention. In this embodiment, elements having the same numerals as ones of the above-mentioned embodiment have the same structures and the same functions, and detailed description are omitted herein for simplicity. Difference between the embodiments is that the slide switch 20' can dispose the plurality of hook portions 42 and the plurality of contact portions 48 on two sides of the body 40, selectively. The buckling component 22 and the constraining component 24 can accordingly include the plurality of connection portions 28, the plurality of inclined structures 30, the plurality of wall structures 32, the plurality of block portions 34, the plurality of guide portions 36 and the plurality of inclined portions 38 disposed on the corresponding positions of the hook portions 42 and the contact portions 48. For unlocking the units in sequence, a gap between each block portion 34 and the corresponding guide portion 36 of the constraining component 22 can be designed according to structural demand, so that the lock/unlock functions of the hook portions 42 and the contact portions 48 can be actuated by different movements of the body 40.

As shown in FIG. 10, the hook portion 42A and the contact portion 48A are respectively disposed on positions of two opposite sides of the body 40. The contact portion 48B is disposed by and distant from the contact portion 48A. A distance between the block portion 34A and the guide portion 36A can be substantially smaller than a distance between the block portion 34B and the guide portion 36B. When the hook portion 42A is engaged with the corresponding engaging structure 28, the contact portions 48A and 48B can respectively contact against the corresponding block portions 34A and 34B, so the slide switch 20' can lock the buckling component 22 and the constraining components 24A and 24B. When the body 40 is pushed to unlock the slide switch 20', the hook portion 42A can press the inclined structure 30 via the first guide structure 44 for pushing the buckling component 22 outwardly, the interference of the hook portion 42A and the wall structure 32 can be released after the buckling component 22 is separated from the latch 26, and the body 40 can be free to be pushed.

As the movement of the body 40, the contact portion 48A can be separated away from the block portion 34A and contacts against the guide portion 36A for sliding, so as to separate the constraining component 24A from the latch 26. Meantime, the contact portion 48B is located between the block portion 34B and the guide portion 36B, and the contact portion 48B has no contact with the block portion 34B and the guide portion 36B. As the body 40 moves, the contact portion 48B contacts the guide portion 36B, and the contact portion 48B can slide relative to the guide portion 36B for separating the constraining component 24B from the latch 26. Therefore, the slide switch 20' of the present invention can constrain the movements of the buckling components 22 and the constraining components 24 simultaneously, and the body 40 can be pushed to execute the separate of the buckling components 22 and the constraining components 24 relative to the latch 26 in sequence.

Comparing to the prior art, the slide switch of the present invention can dispose the plurality of hook portions and contact portions on two sides of the latch, and further include the corresponding buckling components and the constraining components. By adjusting space relation between the connection portion and the inclined structure of the buckling component, and space relation between the block portion and the guide portion of the constraining component, the latch can utilize the hook portions and the contact portions to actuate the corresponding buckling components and the constraining components in sequence and in turn according to the movement of the body, so as to obtain the multiple lock/unlock function. In addition, the slide switch of the present invention has advantages of simple structure, easy operation, low design cost and low manufacturing cost. The present invention can economize structural space, increase artistic appearance, and is extensively applied to the related electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide switch disposed on a casing of an electronic device for constraining movements of a first unit and a second unit relative to the casing, the slide switch comprising: at least one buckling component disposed on the first unit, the at least one buckling component comprising a connection portion and an inclined structure; at least one constraining component disposed on the second unit, the at least one constraining component comprising a block portion and a guide portion; and a latch for latching the at least one buckling component and the at least one constraining component, the latch comprising: a body slidably disposed on the casing; at least one hook portion monolithically integrated with the body, the at least one hook portion being engaged with the connection portion to constrain the movement of the first unit relative to the casing when the body moves to a first position relative to the casing; a first guide structure disposed on a top of the at least one hook portion, the first guide structure pressing the inclined structure when the body moves to a second position relative to the casing to separate the first unit from the casing; and at least one contact portion monolithically integrated with the body, the at least one contact portion contacting against the block portion to constrain the movement of the second unit relative to the casing when the at least one hook portion is engaged with the connection portion, the at least one contact portion being separated from the block portion with a movement of the first guide structure relative to the inclined structure when the body moves to the second position, and when the body moves to a third position relative to the casing, the at least one contact portion slides relative to the guide portion to separate the second unit from the casing.

2. The slide switch of claim 1, wherein the latch further comprises:
a second guide structure disposed on the top of the at least one hook portion the first guide structure and the second guide structure being respectively disposed on two sides of the top, a bottom of the connection portion sliding relative to the second guide structure so as to slide the body relative to the casing.

3. The slide switch of claim 1, wherein the at least one constraining component further comprises:
an inclined portion connected to a side of the block portion adjacent to an inner of the casing, the at least one constraining component sliding the body relative to the casing via a contact between the inclined portion and the contact portion.

4. The slide switch of claim 1, wherein the at least one hook portion is disposed on a first side of the body, and the at least one contact portion is disposed on a second side of the body opposite to the first side.

5. The slide switch of claim 1, wherein the at least one hook portion comprises a plurality of hook portions, the at least one buckling component comprises a plurality of buckling components, each hook portion is matched with the connection portion and the inclined structure of a corresponding one of the buckling components.

6. The slide switch of claim 1, wherein the at least one contact portion comprises a plurality of contact portions, the at least one constraining component comprises a plurality of constraining components, each contact portion is matched with the block portion and the guide portion of a corresponding one of the constraining components.

7. The slide switch of claim 1, wherein the at least one buckling component further comprises a wall structure connected to the inclined structure, the at least one hook portion contacts against the wall structure, so as to constrain a movement of the body from the second position to the third position when the first unit is not separated from the casing.

8. The slide switch of claim 1, further comprising:
a resilient component, two ends of the resilient component being respectively connected to the body and the casing, the resilient component moving the body from the third position to the first position and from the second position to the first position.

9. The slide switch of claim 1, wherein the second position is located between the first position and the third position, the body moves relative to the casing through the first position, the second position and the third position in sequence.

10. The slide switch of claim 1, wherein the first unit is a battery unit, and the second unit is a protection cover.

11. An electronic device comprising: a casing; a first unit detachably disposed on the casing; a second unit detachably disposed on the casing and located at a position different from the first unit; a slide switch for constraining movements of the first unit and the second unit relative to the casing, the slide switch comprising: at least one buckling component disposed on the first unit, the at least one buckling component comprising a connection portion and an inclined structure; at least one constraining component disposed on the second unit, the at least one constraining component comprising a block portion and a guide portion; and a latch for latching the at least one buckling component and the at least one constraining component, the latch comprising: a body slidably disposed on the casing; at least one hook portion monolithically integrated with the body, the at least one hook portion being engaged with the connection portion to constrain the movement of the first unit relative to the casing when the body moves to a first position relative to the casing; a first guide structure disposed on a top of the at least one hook portion, the first guide structure pressing the inclined structure when the body moves to a second position relative to the casing to separate the first unit from the casing; and at least one contact portion monolithically integrated with the body, the at least one contact portion contacting against the block portion to constrain the movement of the second unit relative to the casing when the at least one hook portion is engaged with the connection portion, the at least one contact portion being separated from the block portion with a movement of the first guide structure relative to the inclined structure when the body moves to the second position, and when the body moves to a third position relative to the casing, the at least one contact portion slides relative to the guide portion to separate the second unit from the casing.

12. The electronic device of claim 11, wherein the latch further comprises:
a second guide structure disposed on the top of the at least one hook portion, the first guide structure and the second guide structure being respectively disposed on two sides of the top, a bottom of the connection portion sliding relative to the second guide structure so as to slide the body relative to the casing.

13. The electronic device of claim 11, wherein the at least one constraining component further comprises:
an inclined portion connected to a side of the block portion adjacent to an inner of the casing, the at least one constraining component sliding the body relative to the casing via a contact between the inclined portion and the contact portion.

14. The electronic device of claim 11, wherein the at least one hook portion is disposed on a first side of the body, and the at least one contact portion is disposed on a second side of the body opposite to the first side.

15. The electronic device of claim 11, wherein the at least one hook portion comprises a plurality of hook portions, the at least one buckling component comprises a plurality of buckling components, each hook portion is matched with the connection portion and the inclined structure of a corresponding one of the buckling components.

16. The electronic device of claim 11, wherein the at least one contact portion comprises a plurality of contact portions, the at least one constraining component comprises a plurality of constraining components, each contact portion is matched with the block portion and the guide portion of a corresponding one of the constraining components.

17. The electronic device of claim 11, wherein the at least one buckling component further comprises a wall structure connected to the inclined structure, the at least one hook portion contacts against the wall structure, so as to constrain a movement of the body from the second position to the third position when the first unit is not separated from the casing.

18. The electronic device of claim 11, wherein the slide switch further comprises:
a resilient component, two ends of the resilient component being respectively connected to the body and the casing, the resilient component moving the body from the third position to the first position and from the second position to the first position.

19. The electronic device of claim 11, wherein the second position is located between the first position and the third position, the body moves relative to the casing through the first position, the second position and the third position in sequence.

20. The electronic device of claim 11, wherein the first unit is a battery unit, and the second unit is a protection cover.

* * * * *